Dec. 23, 1930.                H. A. COLE                1,785,936
                       VARIABLE SPEED TRANSMISSION
                        Filed May 13, 1930        8 Sheets-Sheet 3

INVENTOR
Harry A Cole
BY
Mock & Blum
ATTORNEYS

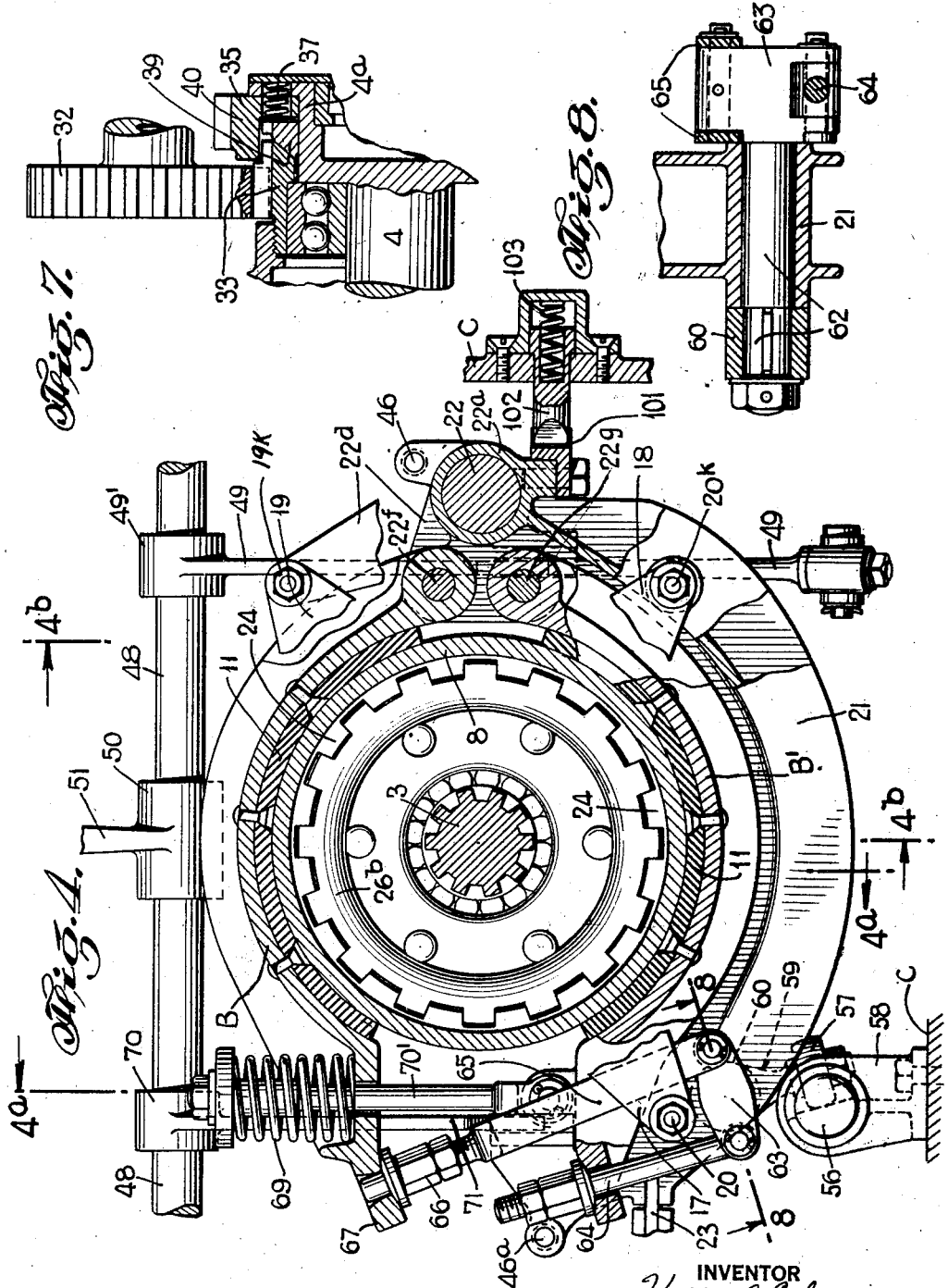

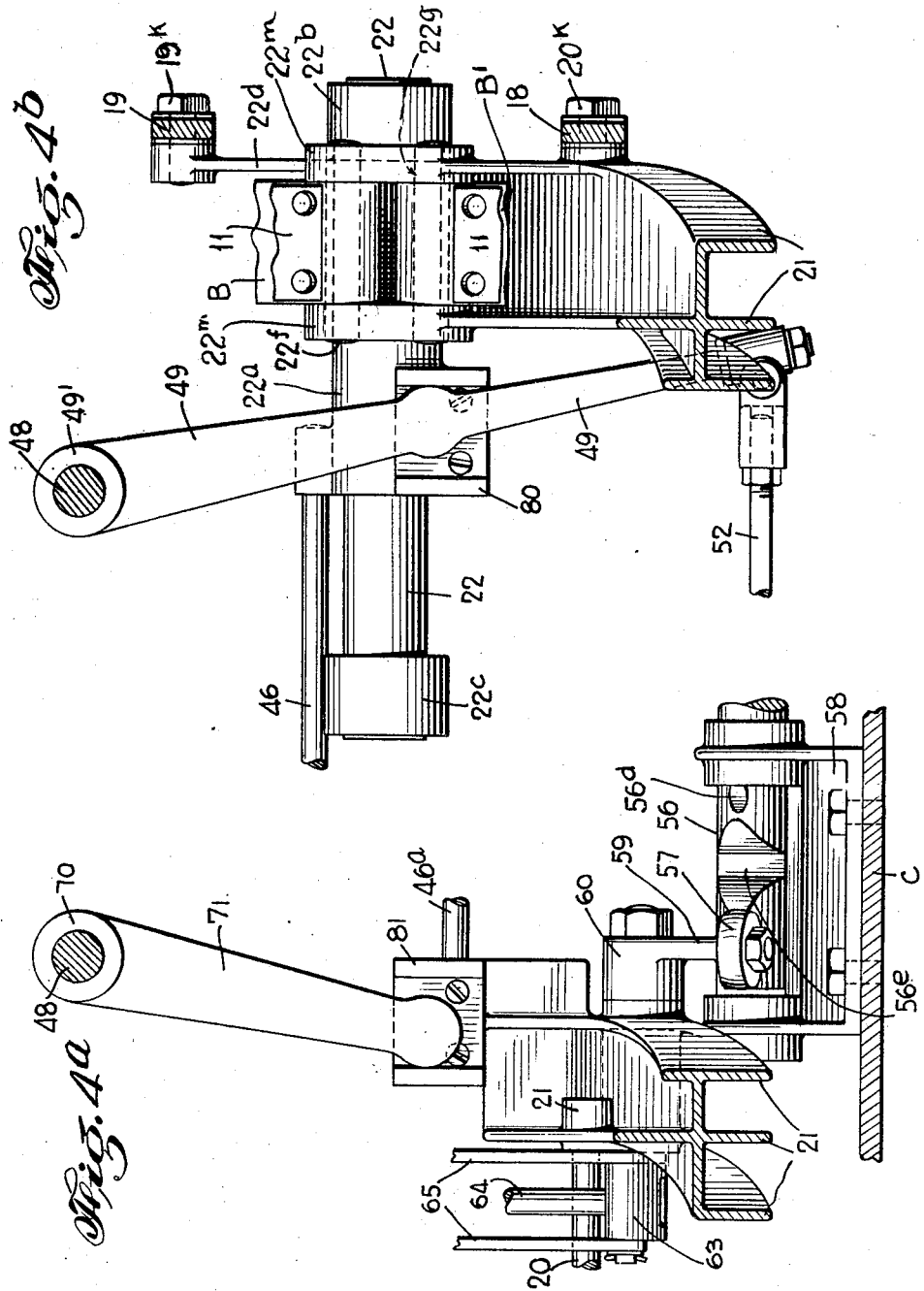

Dec. 23, 1930.   H. A. COLE   1,785,936
VARIABLE SPEED TRANSMISSION
Filed May 13, 1930   8 Sheets-Sheet 6
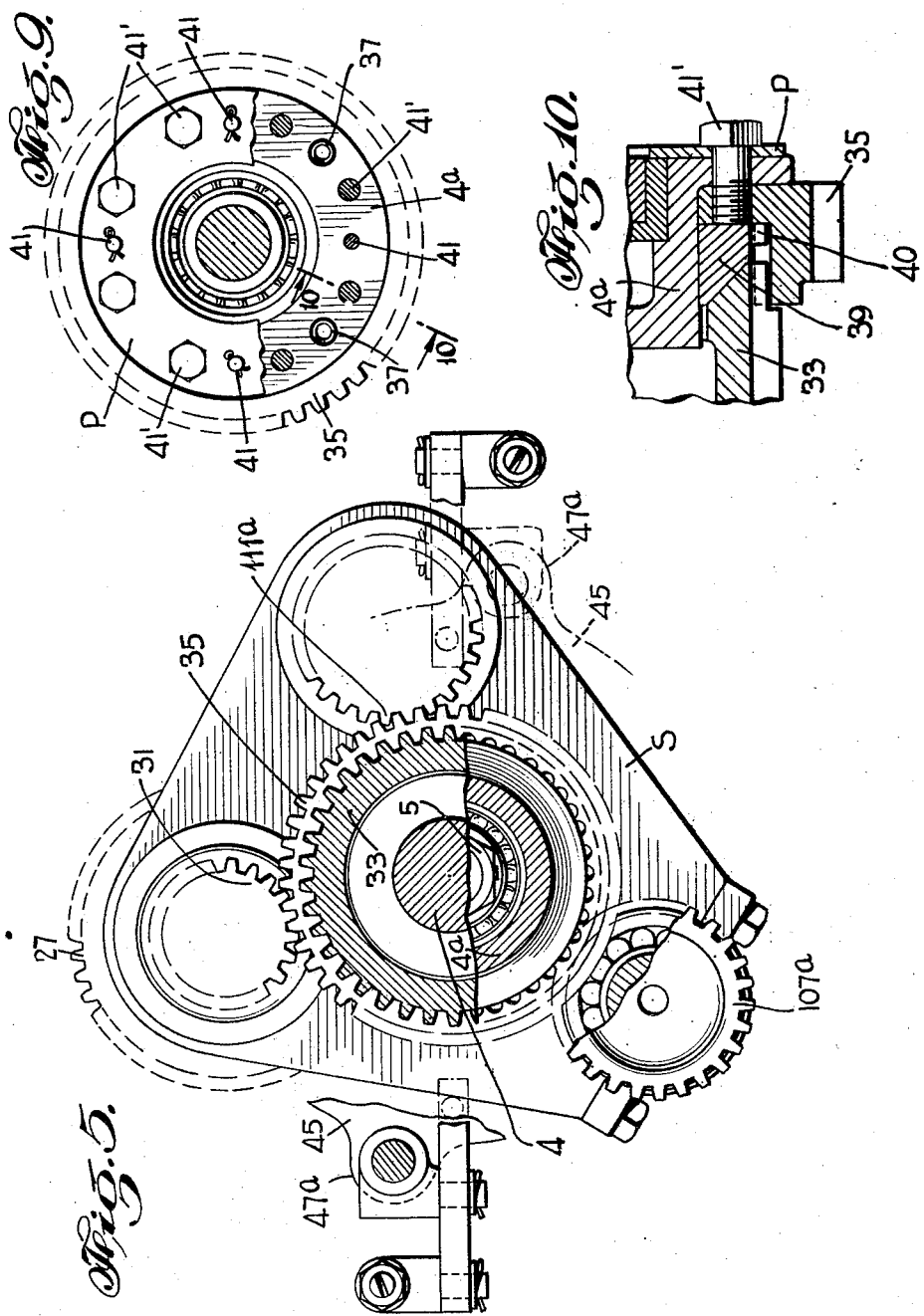
INVENTOR
Harry A. Cole
BY
Morle & Blum
ATTORNEYS Dec. 23, 1930.  H. A. COLE  1,785,936
VARIABLE SPEED TRANSMISSION
Filed May 13, 1930   8 Sheets-Sheet 7
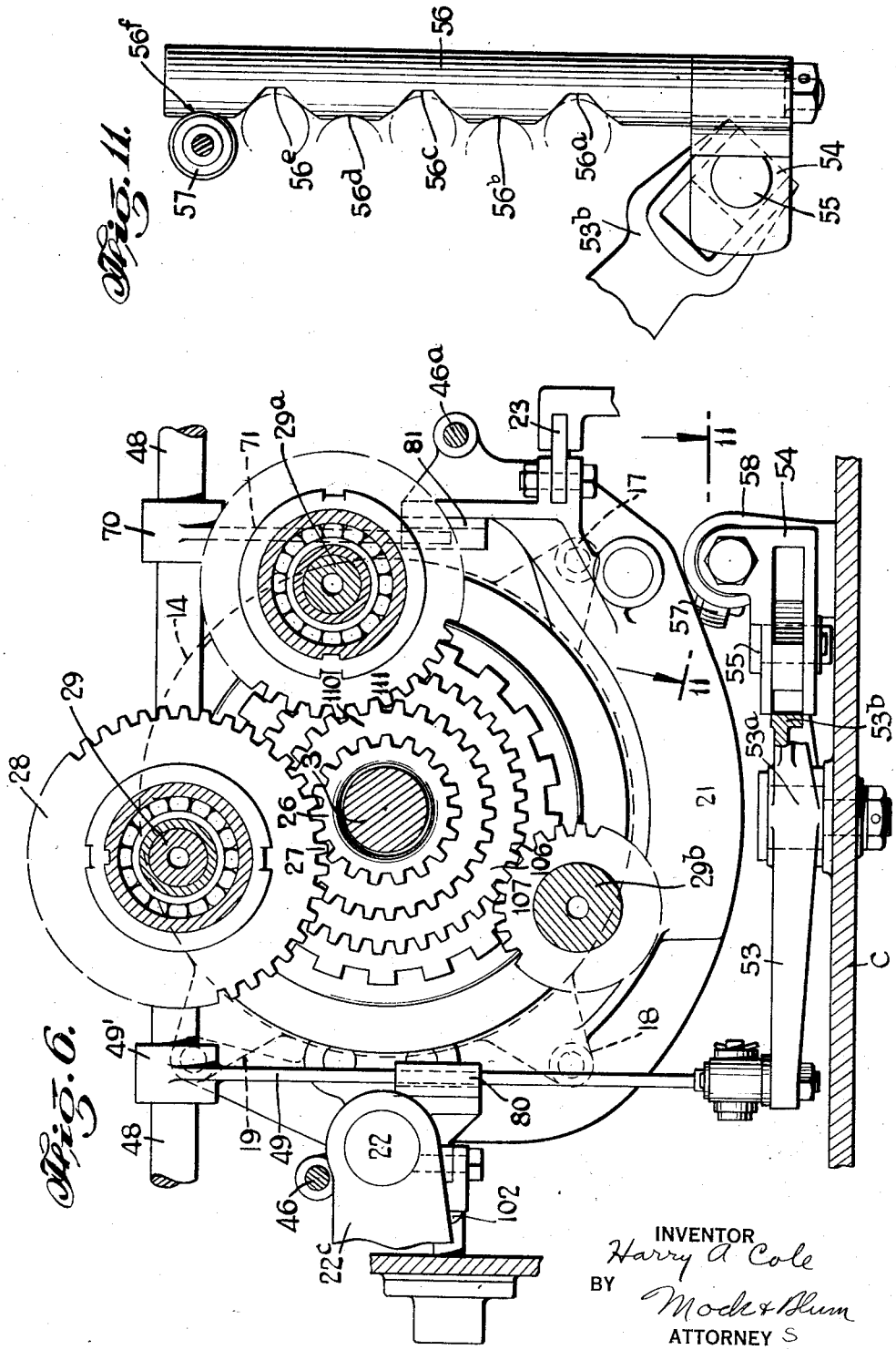

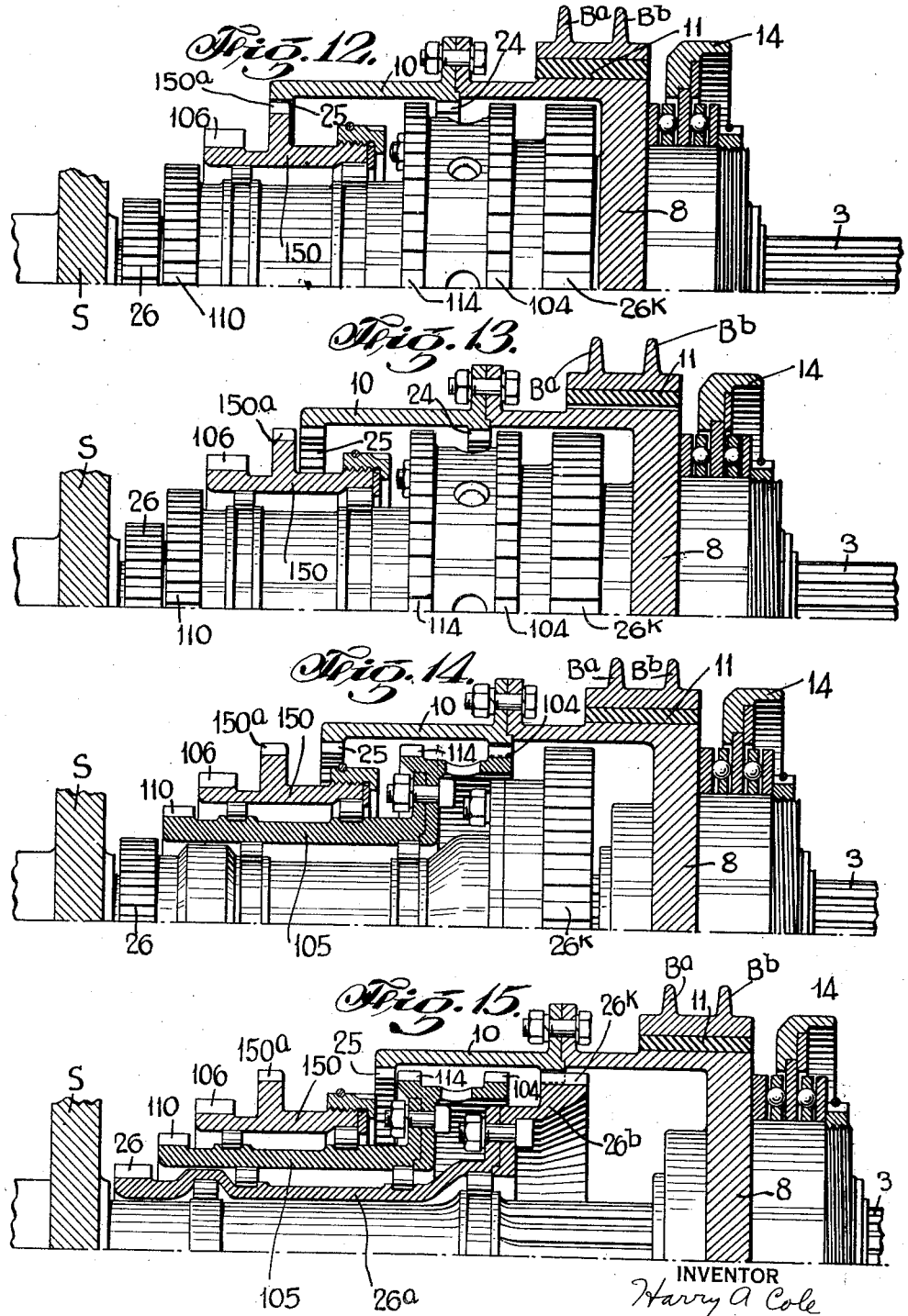

Patented Dec. 23, 1930

1,785,936

UNITED STATES PATENT OFFICE

HARRY A. COLE, OF NEW YORK, N. Y., ASSIGNOR TO COLE SERVICE PLAN, INC., A CORPORATION OF NEW YORK

VARIABLE-SPEED TRANSMISSION

Application filed May 13, 1930. Serial No. 451,914.

This invention relates to a new and improved variable speed transmission.

One of the objects of the invention is to provide a simple and efficient variable speed transmission, which shall be especially adapted for use in automobiles and in other installations in which an internal combustion motor is utilized as the source of power.

Another object of my invention is to provide a variable speed transmission for an internal combustion motor, in which a clutch is eliminated.

Another object of my invention is to provide a variable speed transmission in which all the desired changes of speed can be produced by shifting a single lever forwards or backwards.

Another object of my invention is to provide a simple and efficient device which can be manipulated by operating a rod or lever, which can be conveniently located on the dashboard of an automobile, on the steering column, or in any other convenient location.

Another object of my invention is to provide a variable speed transmission of the planetary type in which the desired speed ratio can be selected by shifting a control member forwards or backwards along a straight line.

Other objects of the invention will be set forth in the following description and drawings which illustrate preferred embodiments thereof, it being understood that the above general statement of the objects of my invention is intended merely to generally explain the same and not to limit it in any manner.

Fig. 4 is a sectional view on the line 4—4 of Fig. 1.

Fig. 4a is a sectional view on the line 4a—4a of Fig. 4.

Fig. 4b is a sectional view on the line 4b—4b of Fig. 4.

Fig. 5 is a sectional view on the line 5—5 of Fig. 2.

Fig. 6 is a sectional view on the line 6—6 of Fig. 2.

Fig. 7 is a detail view of some of the parts of the device, in the "reverse speed" position.

Fig. 8 is a sectional view on the line 8—8 of Fig. 4.

Fig. 9 is a sectional view on the line 9—9 of Fig. 2.

Fig. 10 is a sectional view on the line 10—10 of Fig. 9.

Fig. 11 is a sectional view on the line 11—11 of Fig. 6.

Fig. 12 is a diagrammatic view showing the parts in position for "reverse speed."

Fig. 13 is a diagrammatic view showing the parts in the "neutral position."

Fig. 14 is a diagrammatic view showing the parts in position for "first speed."

Fig. 15 is a diagrammatic view showing the parts in position for "second speed."

Figure 1:
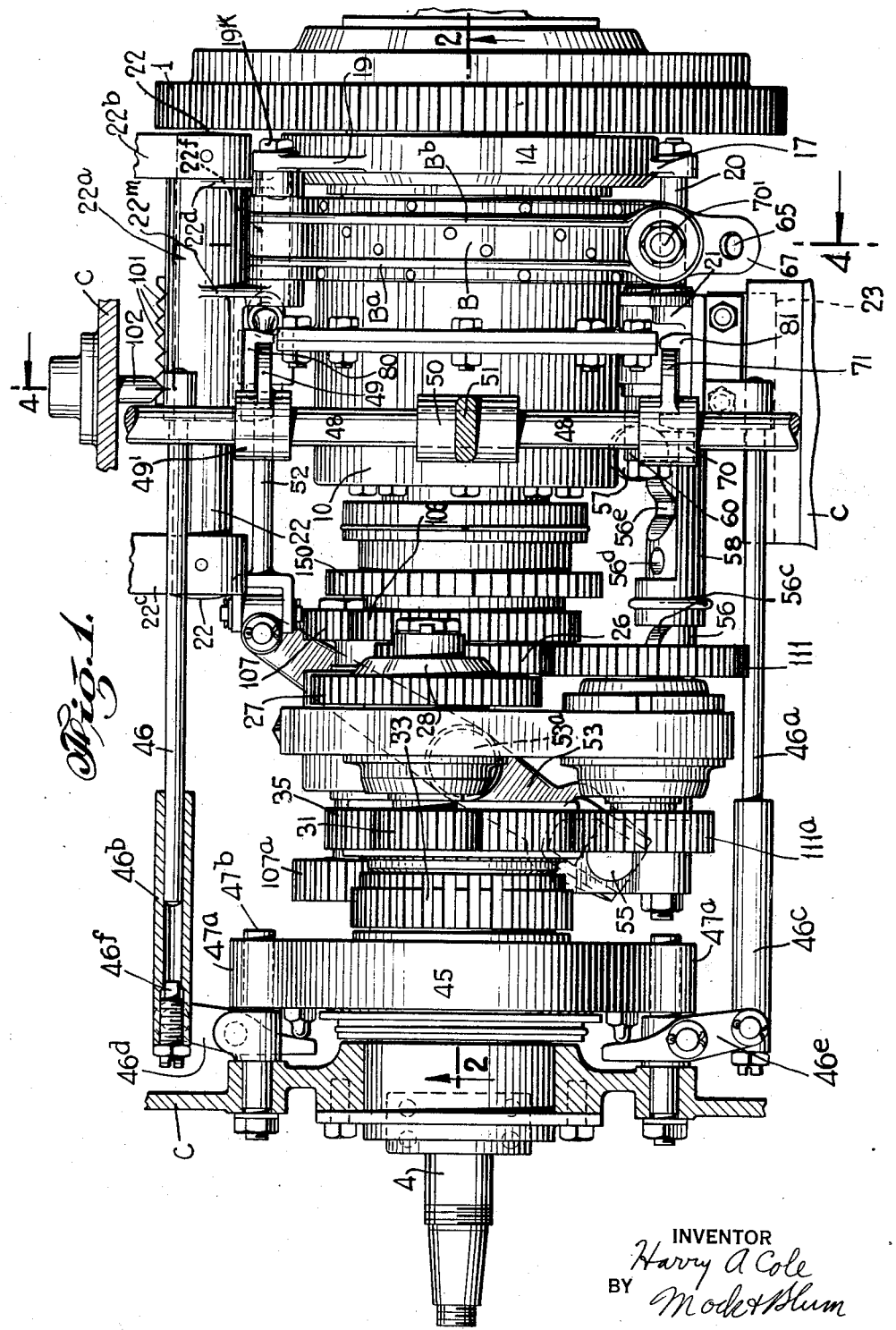
Fig. 1 is a top plan view, the parts being shown in the position for high speed.

In this particular embodiment, the device includes a single "reverse speed" and three "forward speeds" which are designated as "first", "second", and "high". However, the mechanism is not limited to any particular number of forward speeds, as additional forward speeds could readily be provided.

The transmission system may comprise a drive shaft 3 having an enlargement at the front thereof, which is connected by means of bolts 2 to the flywheel 1 of any suitable internal combustion engine which is not shown in the drawings. The front end of the drive shaft 3 is provided with alternating ribs and recesses, so that said ribs act as splines which fit in corresponding recesses provided in the internal wall of the bearing sleeve 6. The bearing sleeve 6 therefore turns with the drive shaft 3, and said bearing sleeve 6 can be longitudinally shifted upon the drive shaft 3.

A brake sleeve 8 is mounted upon the bearing sleeve 6, by means of anti-friction bearings 7. Hence, the brake sleeve 8 is longitudinally shifted in unison with the bearing sleeve 6, but the brake sleeve 8 can remain stationary while the drive shaft 3 and the bearing sleeve 6 turn in unison.

The front end of the brake sleeve 8 is reduced, and a shift member 14 is loosely mounted upon the brake sleeve 8, by means of a disk 15. An anti-friction end-thrust bearing 16 is provided.

The shift member 14 is provided with radially projecting and perforated lugs 17, 18, and 19 which are connected to an eccentric brake support 21 by means of bolts 20, 20k, and 19k.

One end of the brake support 21 is provided with a recess into which extends an arm 23 which is connected to the inner wall of a stationary casing C, in which all the operative parts are mounted. The arm 23 slidably supports the adjacent end of the brake support 21, so that said brake support 21 can be longitudinally moved. The other end of the brake support 21 is provided with a sleeve 22a, which is slidably mounted upon a stationary rod 22, connected to collars provided at the ends of lugs 22b and 22c, which are connected to the inner wall of the casing C.

The brake support 21 and the shift member 14 (both of which may be suitable castings) are longitudinally shifted by means of a rock shaft 48, which is mounted in the casing C. The rock shaft 48 is provided with a collar 50 connected thereto by means of a pin, or the like, and the collar 50 is provided with an arm 51 which may be operated by hand or in any other suitable manner. The arm 51 may be designated as a single master control device, because its actuation produces the automatic movement of all the parts in order to secure a range of speeds, which may include high speed, and may also include low speed. The control of the speed range by means of the movement of a single master control member is an important feature of my invention, and in this respect the invention is not to be limited to the specific mechanism and the specific type of transmission illustrated.

It would not be departing from the invention if the collar 50 were secured to an end of the rock shaft 48, outside of the casing C.

The brake support 21 is provided with a U-shaped member 81 which may be integral therewith, or which may be suitably connected thereto. The sleeve 22a is likewise provided with a U-shaped member 80. The rock shaft 48 is provided with collars 49' and 70 suitably connected thereto, and these collars 49' and 70 have rock-arms 49 and 71 which pass through the U-shaped members 80 and 81. Hence, the rocking of the shaft 48 causes the longitudinal shifting of the members 14 and 21.

As shown in Fig. 4, the brake support 21 is provided with pivot pins 22f and 22g upon which the brake members B and B' are pivotally mounted. These brake members are provided with internal brake linings 11, suitably secured thereto by means of rivets. The brake members may be provided with ribs Ba and Bb. The pivot pins 22f and 22g may be located in an extension 22m of the sleeve 22a. The rear end of the drive shaft 3 is located within a recess provided in the enlarged end of the driven shaft 4. A spider S is keyed to the rear end of the drive shaft 3, and gear control sleeves are concentrically mounted upon the intermediate portion of the drive shaft 3, by means of anti-friction bearings F. The brake support 21 has longitudinal rods 46 and 46a which fit slidably within sleeves 46b and 46c.

Figure 3:
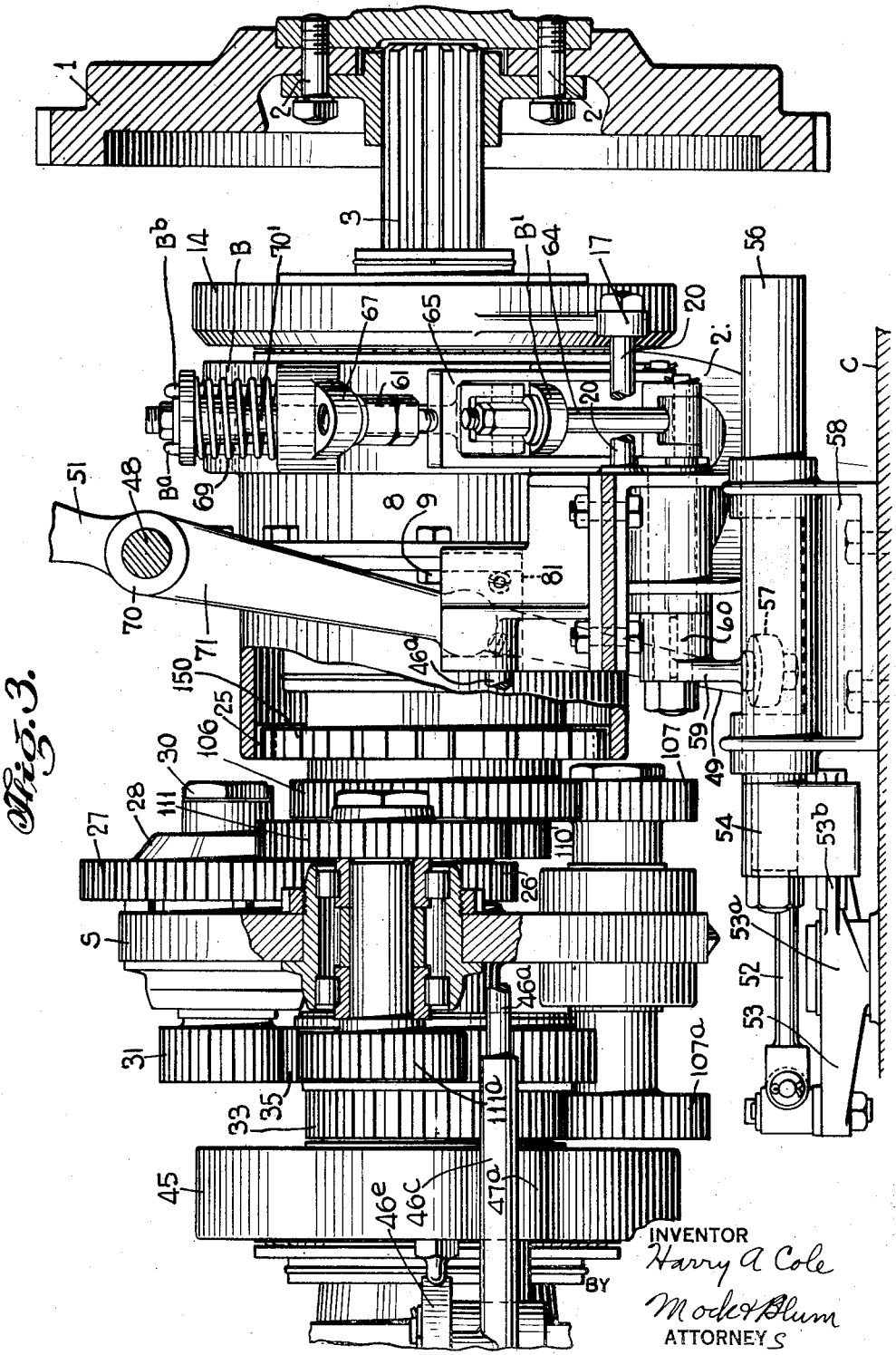
Fig. 3 is a front elevation of Fig. 1 partially in section, the parts having been shifted to the reverse speed position, from the high speed position shown in Figs. 1 and 2.

As shown in Fig. 1, the sleeves 46b and 46c are pivotally connected to short levers 46d and 46e. Hence, when the rods 46 and 46a have been pushed a predetermined distance towards the rear end of the device, their rear ends contact with the adjustable members 46f, so that the sleeves 46b and 46c are shifted towards the rear, thereby causing the turning of the levers 46d and 46e, so that the shift member 45 is moved towards the front of the device, that is, towards the right, in the view represented by Fig. 1. The final shifted position of the member 45 is shown in Fig. 3, which represents the positions of the parts after they have been shifted from the "high speed" position shown in Fig. 1, to the "reverse speed" position shown in Fig. 3.

The member 45 is mounted upon a sleeve 43, by means of a disk 45a, and the driven shaft 4 can turn relatively to the member 45, so that the member 45 does not turn, but merely slides to and fro. End-thrust anti-friction bearings 44 are provided for the member 45a. The sleeve 43 has an internally threaded end which is connected to the externally threaded end portion of a sleeve 33 having external gear teeth. The longitudinal shifting of the member 45 is to throw the "reverse" drive into and out of operation, as will be later more fully explained.

Figure 2:
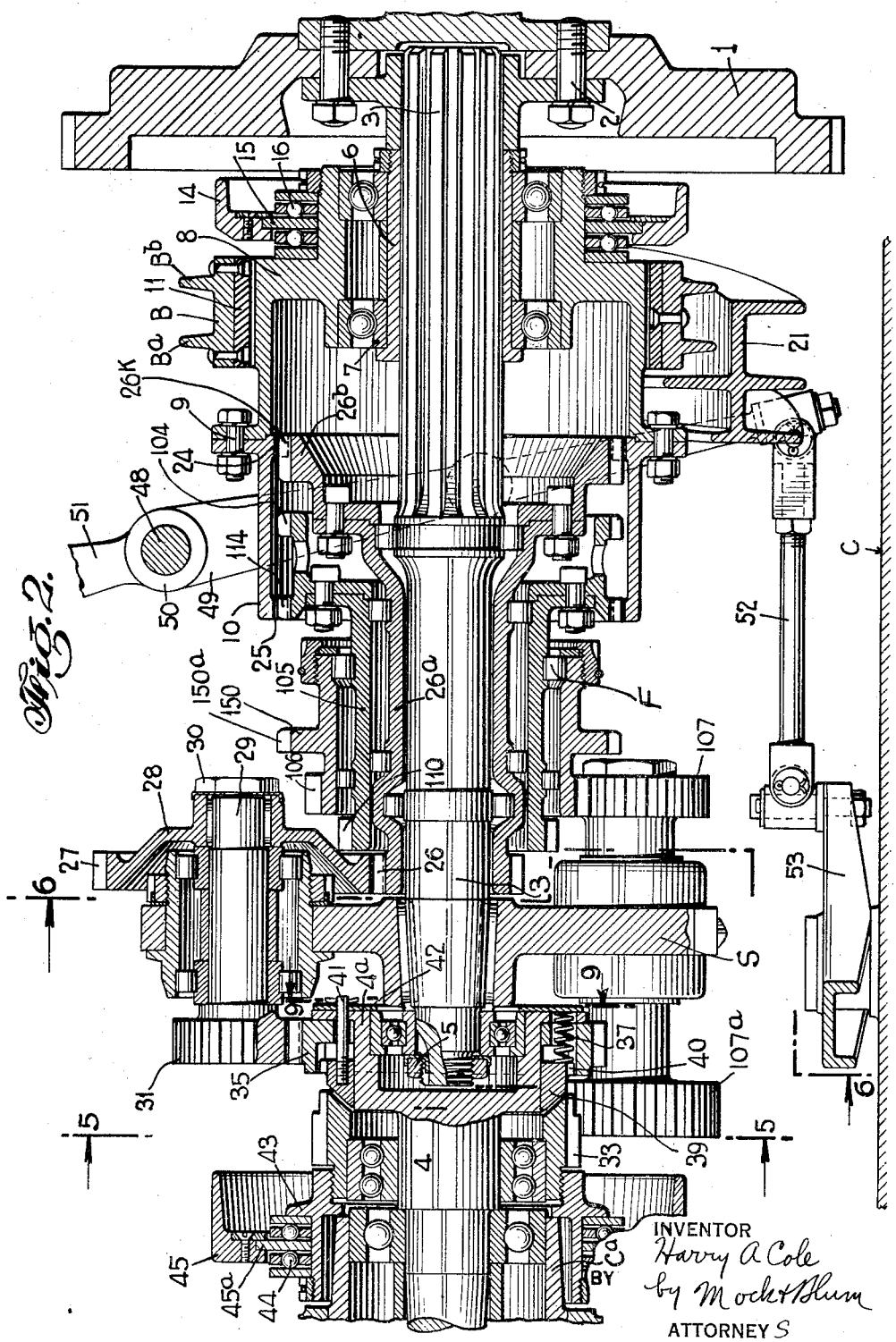
Fig. 2 is a sectional view on the line 2—2 of Fig. 1, showing the parts in high speed.

As shown in Fig. 2, an anti-friction bearing is provided between the shaft 4 and the sleeve 33. The sliding movement of the sleeve 43 towards the rear end of the device is limited by a projection Ca of the casing C, a suitable anti-friction bearing being provided between the corresponding portion of the shaft 4 and said projection or collar Ca. The ball or anti-friction bearing for the enlarged end 4a of the shaft 4, is held in position upon the reduced end of the drive shaft 3, by means of a nut 5.

It will be noted that the sleeve 22a has bosses 22d, which serve to support the pin 22f. Similar bosses are provided for supporting the pin 22g.

The spider S has a series of planetary stub-shafts connected thereto, and the planetary gears for the various intermediate speeds are connected to said stub-shafts. The planetary gears are mounted on separate shafts in order to balance the spider S. However, it would not be departing from the invention if the planetary gears were mounted on a single planetary shaft, as shown in prior devices.

The brake members B and B' are normally held in operative or braking position by means of a compression spring 69 which is mounted upon a rod 70'.

When the brake members are in the inoperative position, as for example, when the transmission is in "high speed", there is a slight clearance between the brake linings 11 and the brake sleeve 8 as shown in Fig. 2.

It will be understood that in order to clearly illustrate both positions of the brake members, that the brake lining is shown as being in contact with the sleeve 8 in Fig. 4. However, the brake is in the inoperative position shown in Fig. 2 when the device is in "high speed".

As shown in Fig. 4, one end of said rod 70' is provided with a collar, and the other end thereof is pivotally connected to the brake member B'.

The brake is automatically released when the system is in "neutral" or is in "high".

As shown in Figs. 4 and 8, a sleeve 63 is provided upon the shaft 62, which passes through member 21. This sleeve 63 is pivotally connected to the rod 64 and to rod 65. Hence, when the rod 64 is actuated, it forces the adjacent brake member B' to the inoperative position, and the head 66 of the rod 65 simultaneously forces the brake member B to the inoperative position.

As shown in Fig. 8, the shaft 62 has a sleeve 60 keyed thereto.

As shown in Fig. 3, the sleeve 60 has an extension 59 which is provided with a roller 57.

As shown in Fig. 11, the roller 57 is actuated by the cam recesses of a control rod 56. When the roller 57 is within the cam recess 56a, the transmission is in "reverse". When the roller 57 is within the cam recess 56b, in which position the brake is inoperative, the transmission is in "neutral". When the roller 57 is within the cam 56c so that the brake is operative, the device is in "first" speed. When the roller 57 is within the cam recess 56d, so that the brake is inoperative, the transmission is in "neutral" between "first speed" and "second speed". When the roller 57 is within the recess 56e in which position the brake is operative, the transmission is in "second speed".

When the roller 57 is within the cam recess 56f so that the brake is inoperative, the transmission is in "high speed".

The control rod 56 is provided with a block 54 which is pivotally connected thereto at 55. This block 54 has a square cross-section and it is embraced by the fork 53b of a lever 53 which is pivotally connected to the rod 52.

The lever 53 is likewise pivotally connected at 53a to the casing C. The rod 52 is pivotally connected to the bottom of the rock-arm 49, as shown in Fig. 4b. Hence, the cam rod 56 is automatically shifted by the rocking of the shaft 48, so as to apply or release the brake as required. The control or cam rod 56 slides in bearing 58.

As shown in Fig. 2, the brake sleeve 8 is connected by means of bolts 9 to a control sleeve 10, and said control sleeve 10 is provided with two series of internal teeth 25 and 24. In this embodiment three control sleeves 26a, 105 and 150 are concentrically mounted upon the intermediate reduced portion of the driving shaft 3. The innermost control sleeve 26a has an extension 26b connected thereto by means of suitable bolts. The intermediate sleeve 105 has an extension bolted thereto, and this last mentioned extension is provided with two series of teeth 104 and 114.

The outermost control sleeve 150 is provided with two series of teeth 106 and 150a.

It will be noted that the external gear teeth 26k and the external gear teeth 104 and 114, all have the same pitch diameter, which is the same as the pitch diameter of the internal teeth 24 and 25 of the control sleeve 10. This is also the same as the pitch diameter of the gear teeth 150a of the outermost control sleeve 150.

The innermost control sleeve 26a is provided with a series of external gear teeth 26 adjacent the spider S. The intermediate control sleeve 105 is provided with a series of gear teeth 110 adjacent said spider S, and the outermost control sleeve 150 is provided with a series of external gear teeth 106 adjacent said spider S.

The spider S is provided with stub-shafts 29, 29a and 29b, as shown in Fig. 6. The stub-shaft 29 is provided with a front gear 28 having gear teeth 27 which are in continuous mesh with the gear teeth 26 of the innermost control sleeve 26a. The stub-shaft 29 likewise has a gear 31 keyed thereto, and this gear 31 is in continuous mesh with the external gear teeth of the sleeve 35, as shown in Fig. 5. The stub-shaft 29a is provided at its front or right hand end with the gear 111 which is keyed thereto, and this gear 111 is in continuous mesh with the gear teeth 110 of the intermediate sleeve 105, as clearly shown in Fig. 6. The other or rear end of the stub-shaft 29 has the gear 111a keyed thereto, and this is also in continuous mesh with the outer gear teeth of the sleeve 35.

The stub-shaft 29b is provided at its front end with the gear 107, which is in continuous mesh with the gear teeth 106 of the outermost sleeve 150. The other end of the stub-shaft 29b is provided with the gear 107a keyed thereto, and this is in continuous mesh with the external gear teeth of the sleeve 33.

The sleeve 35 is provided with internal gear teeth, and it is also provided with a follower 39 having gear teeth which are in continuous mesh with the internal gear teeth of the sleeve 35. The follower 39 is provided with a series of rods 41 having cotter pins which limit the sliding movement of said pins 41 towards the rear of the device. The extreme position of the follower 39 is shown in Fig. 2. The pins 41 slide through the flange of an enlargement 4a of the driven shaft 4, and this enlargement is provided with a plate P which is connected to the flange of said enlargement 4a by means of bolts 41'. A series of springs 37 are provided for urging the follower 39 to the position shown in Fig. 2. The follower 39 has a rear face of a tapered contour and this cooperates with the correspondingly shaped adjacent face of the sleeve 33. The teeth of the follower 39 are designated by the reference numeral 40.

*Reverse speed*

The parts are now in the position shown in Figs. 3, 7, 10 and 12.

While the parts are in "reverse speed", the roller 57 is located within the cam recess 56a so that the brake is in operation.

In order to shift from "neutral" into "reverse," it is necessary to move the roller 57 from the cam recess 56b to the cam recess 56a.

There is a slight lost motion between the rock-arm 49 and its cooperating member 80 and between the rock-arm 71 and its cooperating member 81. Hence, the longitudinally movable parts are shifted to their final position, while the brake is either wholly or partially released.

The internal teeth 25 of the control sleeve 10 now engage the teeth 150a of the outermost control sleeve 150. Since the control sleeve 150 has the gear teeth 106 which are in mesh with the gear 107, the revolution of the spider S causes the stub-shaft 29b to revolve, so that the stub-shaft 29b is revolving about its own axis, and it is also rotating about the central axis of the shaft 3.

The gear 107a which is shown in Fig. 5, is also turned about its own axis, while it is being rotated about the central axis of the shaft 3.

As shown in Fig. 5, the gear 107a has a smaller pitch diameter than the pitch diameter of the external teeth of the sleeve 33. The ratio between these pitch diameters is $$\frac{21}{31}.$$

The ratio between the pitch diameters of the gear teeth 106 and the gear 107 is $$\frac{18}{34}.$$

Since the gear 107a is in continuous mesh with the gear teeth of the sleeve 33, the gear sleeve 33 will be turned. The action of the levers 46d and 46e causes the sleeve 33 to be pushed towards the front of the device. The corresponding tapered faces of the sleeve 33 and of the follower 39 first engage frictionally so that the follower 39 and gear 35 begin to turn in unison with the sleeve 33 to at least some extent before the teeth of the sleeve 33 mesh with the internal teeth of the sleeve 35. When the teeth of the sleeve 33 mesh with the internal teeth of the sleeve 35, the sleeve 35 is turned in a direction opposite to the direction of revolution of the drive shaft 3, thus producing a reverse drive of the shaft 4, since the gear 35 is caused to turn in unison with the shaft 4 by means of the bolts 41'.

It will be understood that the drawings are not necessarily according to scale, and the gear ratios may vary, according to the type of automobile for which the transmission is designed.

The considerations which determine the respective gear ratios may be analyzed as follows:—

It may be assumed that the drive shaft 3 turns in the clockwise direction, and that the longitudinally movable parts have been slid to the position illustrated in Fig. 12, before the brake has been applied to the brake sleeve 8. It is of course desirable that the parts should be longitudinally shifted to the desired position, before the brake is applied to prevent the sleeve 8 from turning, as otherwise it would require considerable effort to longitudinally shift the sleeve 8.

Since the casing is filled with oil or other suitable lubricant, the brake gradually checks the turning of the sleeve 8, and it holds the sleeve 8 against turning after a short interval of time.

Since it has been assumed that the shaft 3 turns in the clockwise direction, the spider S is also caused to turn in the clockwise direction. The sleeve 150 is now prevented from turning while the intermediate sleeve 105 and the innermost sleeve 26a are permitted to freely turn.

The turning of the spider S will cause the gear 107 to revolve in the clockwise direction so that the stub-shaft 29b is revolved in the clockwise direction.

Since the pitch diameter of the gear 107 is smaller than the pitch diameter of the gear 106, the gear 107 will turn at a greater angular velocity than the spider S. Since the gear 107a is also keyed to the same stub-shaft 29b, the gear 107a will also revolve in the clockwise direction. If the sleeve 33 were being turned solely by the revolving movement of the gear 107a about its stub-shaft 29b, the sleeve 33 would be turned in the counterclockwise direction, so that the shaft 4 would be turned in a direction "reverse" to the direction in which the shaft 3 is turning.

If the shaft 4 were locked and the shaft 3 were turned in the clockwise direction while the gear 107a was permitted to freely revolve, the gear 107a would be caused to revolve with an angular velocity depending upon the ratios of the pitch diameters of the teeth of the sleeve 33 and of said gear 107a. By causing the angular velocity of the gear 107a to exceed the velocity which would be produced by a free rolling movement of the gear 107a upon the sleeve 33, the sleeve 33 is caused to turn in a direction opposite to the direction of turning of the spider S, and of the shaft 3. When the longitudinally movable parts are shifted out of the "reverse speed" indicated in Fig. 3, the springs 37 are free to push the follower 39 into the position indicated in Fig. 2, so that the teeth of the sleeve 33 no longer mesh with the internal teeth of the sleeve 35.

The sleeve 33 is in full mesh with the gear 107a when the reverse drive is being utilized, and these two members are in partial mesh when the reverse drive is not being used.

*First speed*

The cam rod 56 is shifted so that the roller 57 passes from the cam recess 56b to the next recess 56c. This is done by actuating the rock-shaft 48 which simultaneously shifts the control sleeve 10 into the position indicated in Fig. 14. This longitudinal shifting is accomplished before the brake is in full operative position.

In this position the internal teeth 24 of the control sleeve 10 mesh with the teeth 104 of the extension of the intermediate sleeve 105. The brake operates to hold the sleeve 105 against turning.

Assuming that the shaft 3 is turning in the same or clockwise direction, the spider S is also turned in the clockwise direction.

As shown in Fig. 6, the gear 111, mounted upon the stub-shaft 29a is in mesh with the gear teeth 110 of the intermediate sleeve 105. Likewise, the pitch diameter of the gear 111 is greater than the pitch diameter of the gear teeth 110. Hence, the angular velocity of the gear 110 will be less than the angular velocity of the spider S. That is, if it is assumed that the shaft 3 together with the spider S are turning at the rate of 1,000 R. P. M. the gear 110 will revolve at less than 1,000 R. P. M. The gear 111 will revolve in the clockwise direction. The gear 111a is on the shaft 29a so that it will also turn in the clockwise direction. The angular velocity thus imparted to the gear 111a is less than the angular velocity which would be imparted thereto if the spider S were being turned at the theoretical speed of 1,000 R. P. M. while the gear 35 was held stationary and said gear 111a was allowed to freely turn. Hence, the gear 35 will be turned in the clockwise direction so that the shaft 4 will also be turned in the clockwise direction at an angular velocity which is considerably less than the angular velocity of the shaft 3.

When the transmission is in "first speed", the outermost sleeve 150 will not be positively driven, because the sleeve 33 is no longer in mesh with the internal teeth of the sleeve or gear 35.

*Second speed*

The parts are now moved to the position shown in Fig. 15, it being understood that the longitudinal movement of the parts is accomplished while the brake is wholly or partially released.

In this position, and as shown in Fig. 15, the internal teeth 24 of the control sleeve 10 mesh with the teeth 26k of the extension 26b of the innermost sleeve 26a. When the brake is applied, the gear teeth 26 are held stationary. Assuming that the shaft 3 is still turning in the clockwise direction, the gear teeth 27 of the gear 28 will mesh with the stationary teeth 26, so that the gear 28 will be caused to turn in the clockwise direction.

As shown in Fig. 6, the ratio between the pitch diameters of the gears 28 and 26 is greater than the ratio between the pitch diameters of the gears 111 and 110. Hence, when the spider S is revolved in the clockwise direction, the angular speed of revolution of the gear 28 will be less than the angular velocity of revolution which the gear 111 had, when the transmission was in "first speed". The gear 31 is thus caused to turn about its own center in the clockwise direction at a relatively low speed, so that the gear 35, together with the shaft 4, will be moved in the clockwise direction with greater velocity than when the parts were in "first speed".

*High speed*

The parts are now in the position shown in Figs. 1 and 2.

In this position the internal teeth 24 of the control sleeve 10 mesh with the teeth 26k, and the internal teeth 25 mesh with the teeth 114.

The sleeves 105 and 26a are therefore both locked against relative turning, and the brake is released so as to permit the free turning of the sleeves 8 and 10. In this position the shaft 3, the sleeve 26a, and the sleeve 105, the spider S and the shaft 4, all turn in unison and in the same direction.

It is an important feature of the invention that no friction device is utilized when the parts are in "high speed" because the parts are then positively interlocked. Hence, even if the brake lining becomes somewhat worn so that there may be some slipping in "reverse", or in "first speed" or in "second speed", there is no slipping when the transmission is in "high speed". In order to cause the parts to be consecutively shifted into proper position, the sleeve 22a is provided with a series of teeth 101 which are engaged by the pawl 102 which is forced against the teeth 101 by a suitable spring 103.

The parts are so designed as to permit the ready shifting from one speed to another without excessive clashing of gears or wear of the parts.

For example, when the transmission is in "reverse speed", the outermost sleeve 150 is locked, and the intermediate sleeve 105 and the innermost sleeve 26a are free to turn.

When the transmission is in "reverse", the spider S is turning in the clockwise direction, and the gear 35 is turning in the counter-clockwise direction.

Hence, the gears 28 and 111 are then turning in the clockwise direction, and the sleeves 105 and 26a are being turned in the counter-clockwise direction.

Hence, it is desirable that the automobile should be brought to a stop before changing from "reverse speed" to "first speed", as in using an ordinary gear transmission system.

When the parts are in "first speed", the sleeve 105 is locked, and the sleeve 150 is not given any positive turning movement, because the sleeve 33 is then out of engagement with the internal teeth of the sleeve 35. The sleeve 26a is free to turn. When the parts are in "first speed", the shaft 4 is turning in the clockwise direction, with a smaller angular velocity than the shaft 3 which is also turning in the clockwise direction.

Hence, the gear 31 will be turned in the clockwise direction, and the gear 28 will also be turned in the clockwise direction, thus imparting a counterclockwise turning movement to the sleeve 26a.

When the device is in "neutral" between "first speed" and "second speed", the angular velocity of the shaft 3 is reduced much more rapidly than the angular velocity of the shaft 4. When the shafts 3 and 4 have the same angular velocity, the turning movement of the stub-shafts becomes zero, so that the control sleeves turn at the same angular velocity as the shafts 3 and 4. When the brake is released from the sleeve 8, there is sufficient friction in the bearings 7 between this sleeve and the sleeve 6 so that the sleeve 8 is turned at the same angular velocity as the shafts 3 and 4. Hence, when the device is shifted into "second speed", there will be little or no clashing of gears. Likewise, the "second speed" does not become operative until the brake is sufficiently tightened to hold the sleeve 8 against turning movement, and since the casing C is filled with oil or other suitable lubricant, the action of the brake is gradual so that no excessive strain is imposed upon the parts.

When the device is in "second speed", the spider S is turning faster than the gear 35. The sleeve 150 remains free from positive actuation, for the reason before stated. Since the spider S is turning faster than the gear 35, the gear 111a is being turned in the clockwise direction so that the gear 111 is also turned in the clockwise direction, and the sleeve 105 is being turned in the clockwise direction.

However, as the speed of the motor shaft 3 is rapidly reduced, the condition previously specified will soon be reached, namely, a condition in which the shafts 3 and 4, and the sleeves 8, 26a, 105 and 150 will all turn in the same direction, so that the device can be shifted into "second" with little or no clashing of gears.

Likewise, when the device is to be shifted into "high", the speed of the motor shaft 3 will diminish until the parts before mentioned, are all turning in unison, so that the shift into "high" can be made without imposing any undue strain upon the parts.

It will be noted that the driven shaft is actuated, below high speed, by one of a plurality of trains of gears, each said gear train including one of the planetary gears mounted on a revoluble carrier, and that the desired operative gear train is selected by a single brake device and a single brake drum. However, in certain aspects of the invention, it is not limited to the use of a single brake device or to the use of a single brake drum.

In order to more clearly illustrate the effective principles of the invention, certain examples will be given of the operation of the gear ratios, it being understood that these gear ratios may be varied without departing from the invention.

When the device is in "reverse", and assuming that the speed of revolution of the shaft 3 can be represented by "R", the angular velocity of the gear 107 will be $$\frac{34}{18}$$

or approximately 1.9R.

If the gear 35 were held stationary, and the gear 107a were allowed to freely turn, while the spider S was being turned at said speed R, then the angular velocity of the gear 107a would be approximately 1.5R. Hence, the gear 107a is now being turned .4R in excess of what may be designated as its "free rolling speed". Bearing in mind that the gear 33 turns at a lower speed than the gear 107a when said gear 33 is being revolved by 107a, it can be seen that gear 33 and gear 35 will be turned in the reverse direction at a speed which is about twenty-five per cent of the speed of the motor shaft 3.

The ratio of the pitch diameters of the gears 111 and 110 is $$\frac{29}{27},$$

and the ratio of the pitch diameters of the gears 111a and 35 is $$\frac{20}{36}.$$

From the considerations above mentioned, it can be seen that when the device is in "first speed", the velocity of shaft 4 is about fifty per cent of the angular velocity of the motor shaft 3.

The ratio of the pitch diameters of the teeth 27 and the gear teeth 26 is $$\frac{33}{19},$$

and the ratio of the pitch diameters of the gears 31 and 35 is $$\frac{16}{36}.$$

Hence, when the device is in "second speed", the angular velocity of the shaft 4 is about seventy-five per cent of the angular velocity of the motor shaft 3.

Of course it is assumed that when the transmission is being shifted into a neutral position between one speed and a higher speed, that the supply of fuel to the motor will be shut off, so that the motor will rapidly slow down to idling speed.

It will also be noted that the transmission is directly shifted from "high" to "second", when a lower speed is desired without passing through an intermediate neutral position.

The shift members 45 and 14 do not turn, as they are merely shifted to and fro along a line parallel to the common central axis of the shafts 3 and 4. The shift member 45 is provided with ears 47a so that it can slide upon rods 47b which are connected to the casing C.

When the motor has been started and it is merely idling while the automobile is stationary so that the roller 57 is in the cam recess 56b, the shaft 4 and gear 35 are stationary, and the shaft 3 and its spider S are revolving in the clockwise direction.

The reverse speed control sleeve 150 is not positively actuated, because the sleeve 33 is not in mesh with the internal teeth of gear 35, so that the stub-shaft 29b merely rotates about the common central axis of shafts 3 and 4, without revolving.

The gear 31 is caused to turn in the clockwise direction at a velocity which is $$\frac{9}{4}$$

or 2.25 times the velocity of shaft 3, and the gear 28 is also turned with the same velocity.

If the gear 28 were being turned while the second speed control sleeve 26a was held stationary, it would turn clockwise at a velocity of $$\frac{19}{33}$$

or approximately .57 of the speed of shaft 3. Hence, the gear 28 is now being revolved at a velocity which is 1.68 times in excess of its free rolling velocity and the second speed control sleeve will be turned counterclockwise at a velocity of $$1.68 \times \frac{33}{19}$$

or about 2.8 times the velocity of the shaft 3.

During the idling of the motor, the gear 111a is being turned in the clockwise direction at a velocity which is 1.8 times the velocity of shaft 3, and gear 111a turning in unison with gear 111.

The free rolling velocity of gear 111 with respect to gear 110 (assuming that gear 110 is held stationary) is $$\frac{27}{29}$$

or .93 times the velocity of shaft 3. Hence, gear 111 is being turned in the clockwise direction at a velocity which is .87 in excess of its free rolling velocity. Hence, the first speed control sleeve is then turning counterclockwise at a velocity which is approximately .9 the velocity of the shaft 3.

However, the idling speed of the motor is low, and the control sleeves 26a, 105, and 150 are made as light as possible so that there will be little clashing when the transmission is shifted into first speed.

Likewise, when the device is in the initial neutral position, shown in Fig. 13, the counterclockwise turning of the first and second speed control sleeves in the lubricant with which the casing is filled, will tend to cause the main control sleeve 10 to turn counterclockwise, so that clashing is eliminated. In addition, when the operator attempts to shift into first speed, the end faces of teeth 24 will initially contact with the end faces of teeth 104 so that the sleeves 105 and 10 will tend to turn at the same velocity when they interlock.

When the device is in first speed, the gear 35 is turning at about one-half the velocity of the spider, and both are turning in the same direction.

Hence, the gears 31 and 28 turn in the clockwise direction with a velocity of about 1.12R. The free rolling velocity of gear 28 on gear 26 is about .58R. Hence, the gear 28 is being turned .54R in excess of its free rolling velocity and sleeve 26a will be turned counterclockwise at about .9 of the speed with which the shaft 3 is turning in the clockwise direction.

The advantage of having the reverse speed control sleeve 150 disconnected from the drive when the reverse speed is not being utilized, is to prevent said reverse speed control sleeve from being turned in the counterclockwise direction at very high velocity. This would result in a considerable waste of power, and it would also make the transmission very noisy when it was idling.

The transmission is mainly operated in high speed and in second speed. When the second speed is being utilized, the sleeve 105 is turned at low speed so that the transmission is not noisy during the time of most frequent use.

I have shown a preferred embodiment of my invention, but it is clear that numerous changes and omissions can be made without departing from its spirit.

I claim:

1. A planetary speed transmission system for a shaft having gear means located thereon, comprising a driving shaft, a plurality of planetary shafts mounted on said driving shaft so that said planetary shafts rotate in unison with said shaft, planetary gears mounted upon said planetary shafts, and in continuous mesh with said gear means, said planetary shafts having additional gears mounted thereon, a plurality of sleeves concentrically mounted upon said driving shaft and upon each other and having teeth which are in continuous mesh with said additional gears, and a control sleeve mounted for longitudinal movement with respect to said driving shaft, said sleeve being adapted to selectively and individually interlock with a plurality of said sleeves and to also simultaneously interlock with a plurality of said sleeves.

2. A planetary speed transmission system for a shaft having gear means thereon, comprising a driving shaft, a driven shaft aligned with said driving shaft, a plurality of planetary shafts mounted on said driving shaft so that said planetary shafts rotate in unison with said driving shaft, planetary gears mounted upon said planetary shafts and in continuous mesh with said gear means, said planetary shafts having additional gears mounted thereon, a plurality of sleeves concentrically mounted upon said driving shaft and upon each other and having teeth which are in continuous mesh with said additional gears, a slide member slidably mounted upon said driving shaft and turnable in unison therewith, a control sleeve mounted upon said slide member so that said slide member can turn with respect to said control sleeve and said slide member and said control sleeve move longitudinally in unison, said control sleeve having means adapted to selectively lock said concentrically mounted sleeves against movement in order to produce the turning of said driven shaft at a plurality of speeds which are less than the speed of the driving shaft, a brake adapted to prevent the turning movement of said control sleeve, and control members adapted to simultaneously actuate said sleeve and said brake so that said brake is at least partially released while said control sleeve is shifted to its interlocking positions.

3. A planetary speed transmission system for a shaft having gear means located thereon, comprising a driving shaft, a driven shaft aligned with said driving shaft, a plurality of planetary shafts mounted on said driving shaft so that said planetary shafts rotate in unison with said driving shaft, planetary gears mounted upon said planetary shafts and in continuous mesh with said gear means, said planetary shafts having additional gears mounted thereon, a plurality of sleeves concentrically mounted upon said driving shaft and upon each other and having teeth which are in continuous mesh with said additional gears, a slide member slidably mounted upon said driving shaft and turnable in unison therewith, a control sleeve mounted upon said slide member so that said slide member can turn with respect to said control sleeve and said slide member and said control sleeve move longitudinally in unison, said control sleeve having means adapted to selectively lock said concentrically mounted sleeves against movement in order to produce the turning of said driven shaft at a plurality of speeds which are less than the speed of the driving shaft, a brake adapted to prevent the turning movement of said control sleeve, and control means adapted to simultaneously actuate said sleeve and said brake so that said brake is at least partially released while said control sleeve is shifted to said locking positions, said control sleeve being also movable by said control means to a position in which it interlocks a plurality of said concentrically mounted sleeves to cause the driving shaft and the driven shaft to turn in unison, said control means being then operative to release said brake.

4. A planetary speed transmission system for a shaft having gear means located thereon, comprising a driving shaft, a driven shaft aligned with said driving shaft, a plurality of planetary shafts mounted on said driving shaft so that said planetary shafts rotate in unison with said driving shaft, planetary gears mounted upon said planetary shafts and in continuous mesh with said gear means, said planetary shafts having additional gears mounted thereon, a plurality of sleeves concentrically mounted upon said driving shaft and upon each other and having teeth which are in continuous mesh with said additional gears, a slide member slidably mounted upon said driving shaft and turnable in unison therewith, a control sleeve mounted upon said slide member so that said slide member can turn with respect to said control sleeve, and said slide member and said control sleeve move longitudinally in unison, said control sleeve having means adapted to selectively lock said concentrically mounted sleeves against movement in order to produce the turning of said driven shaft at a plurality of speeds which are less than the speed of the driving shaft, a brake adapted to prevent the movement of said control sleeve, a cam rod having a succession of cam recesses, a follower adapted to cooperate with said recesses and connected to the brake in order to set the brake into the operative or into the inoperative position, and control means adapted to simultaneously shift said sleeve and to shift said cam rod so that said brake is at least partially released while said control sleeve is shifted to said locking positions, said control sleeve being also movable by said control means to a position in which it interlocks a plurality of said concentrically mounted sleeves to cause the driving shaft and the driven shaft to turn in unison, said cam rod being then effective to hold the brake in its inoperative position.

5. A speed transmission system comprising a driving shaft, a driven shaft, gear means mounted upon the driven shaft and turnable in unison therewith, a plurality of planetary gear shafts connected to said driving shaft so that said planetary gear shafts rotate about the axis of said driving shaft, planetary gears mounted upon said planetary gear shafts and in continuous mesh with said gear means on the driven shaft, additional gears mounted upon said planetary gear shafts, control sleeves having sets of teeth which are in continuous mesh with said additional gears, said control sleeves having additional rows of gear teeth of the same pitch diameter, and a longitudinally shiftable control sleeve having internal teeth of said pitch diameter, the internal teeth of said control sleeve being adapted to selectively interlock with the additional gear teeth of said control sleeves, and to also simultaneously interlock with a plurality of said rows of additional gear teeth in the control sleeves.

6. A speed transmission system comprising a driving shaft, a driven shaft, a plurality of gear trains adapted to actuate said driven shaft at different speeds relative to said driving shaft, each said gear train including a planetary gear which is adapted to be actuated by the turning of said drive shaft, a turnable carrier on which said planetary gears are mounted, and control means adapted to select a gear train and to cause the operation thereof, said control means including only a single shiftable brake device and only a single brake member braked thereby and shiftable therewith.

7. A speed transmission system comprising a driving shaft, a driven shaft, a plurality of gear trains adapted to actuate said driven shaft at different speeds relative to said driving shaft, each said gear train including a planetary gear which is adapted to be actuated by the turning of said drive shaft, a turnable carrier on which said planetary gears are mounted, each said gear train also including a turnable control sleeve which has teeth, said control sleeves being concentric with respect to the axis of the driving shaft, and control means adapted to selectively mesh with the teeth of said control sleeves in order to prevent the turning of the selected control sleeve.

8. A speed transmission system comprising a driving shaft, a driven shaft, a plurality of gear trains adapted to actuate said driven shaft at different speeds relative to said driving shaft, each said gear train including a planetary gear which is adapted to be actuated by the turning of said drive shaft, a turnable carrier on which said planetary gears are mounted, and selector means adapted to select a gear train to operate said driven shaft, said selector means including a selector sleeve through which the axis of the driving shaft passes, said sleeve being shiftable in a direction parallel to said axis and being turnable about said axis.

9. A speed transmission system comprising a driving shaft, a driven shaft, a plurality of gear trains adapted to actuate said driven shaft at different speeds relative to said driving shaft and to also actuate said driven shaft in a direction reverse to that of the driving shaft, each said gear train including a planetary gear which is adapted to be actuated by the turning of said drive shaft, a turnable carrier on which the planetary gears are mounted, and selector means adapted to select a gear train to operate said driven shaft, said selector means including a selector sleeve through which the axis of the driving shaft passes, said sleeve being shiftable in a direction parallel to said axis and being turnable about said axis.

10. A speed transmission system comprising a driving shaft, a driven shaft, a plurality of gear trains adapted to actuate said driven shaft at different speeds relative to said driving shaft, each said gear train including a planetary gear which is adapted to be actuated by the turning of said drive shaft, a turnable carrier on which said planetary gears are mounted, each said gear train also including a turnable control sleeve, said control sleeves being concentric with respect to the axis of the driving shaft, and control means adapted to selectively mesh with said control sleeves in order to prevent the turning of the selected control sleeve, said control means being also adapted to simultaneously intermesh with a plurality of said control sleeves and to then turn with said control sleeves in order to cause the driving shaft and the driven shaft to turn in unison.

11. A speed transmission system comprising a driving shaft, a driven shaft, a plurality of gear trains adapted to actuate said driven shaft at different speeds relative to said driving shaft, each said gear train including a planetary gear which is adapted to be actuated by the turning of said drive shaft, a turnable carrier on which said planetary gears are mounted, and selector means adapted to select the gear train to operate said driven shaft, said selector means including a selector sleeve through which the axis of the driving shaft passes, said sleeve being shiftable in a direction parallel to said axis, said selector sleeve being turnable, and having a movable brake adapted to hold it against turning, said brake being releasable from said selector sleeve.

12. A speed transmission system comprising a driving shaft, a driven shaft, a plurality of gear trains individually adapted to actuate said driven shaft at a plurality of different speeds lower than the speed of said driving shaft, said gear trains being also adapted to turn said driven shaft in unison with said driving shaft when a plurality of said gear trains are intermeshed, each said gear train including a planetary gear which is adapted to be actuated by the turning of said driving shaft, a turnable carrier on which said planetary gears are mounted, and turnable control means adapted to cause the interlocking of a plurality of said gear trains.

13. A speed transmission system comprising a driving shaft, a driven shaft, a plurality of gear trains adapted to actuate said driven shaft at different speeds relative to said driving shaft, said gear trains being adapted to cause the driving shaft and the driven shaft to turn in unison when a plurality of said gear trains are interlocked, and control means adapted to select a gear train and to cause the actuation thereof and to also interlock a plurality of said gear trains, said control means being operated by a single master control member, each said gear train including a planetary gear which is adapted to be actuated by the turning of said drive shaft, and a turnable carrier on which said planetary gears are mounted.

14. A speed transmission system comprising a driving shaft, a driven shaft, a plurality of gear trains adapted to actuate said driven shaft at different speeds relative to said driving shaft, said gear trains being adapted to cause the driving shaft and the driven shaft to turn in unison when a plurality of said gear trains are interlocked, and control means adapted to select a gear train and to cause the actuation thereof and to also interlock a plurality of said gear trains, said control means being operated by a single master control member.

15. A speed transmission system comprising a driving shaft, a driven shaft, connecting means intermediate said driving shaft and said driven shaft adapted to operate the driven shaft at different speeds relative to said driving shaft, and to also actuate said driving shaft in unison with said driven shaft, said connecting means including a plurality of gear trains which are adapted to actuate said driven shaft at a plurality of different speeds which are less than the speed of said driving shaft, and control means operable by a single master control member and adapted to automatically select a desired gear train, the movement of said single master control member being also operative to set said connecting means so that said driving shaft and driven shaft turn in unison.

In testimony whereof I affix my signature.

HARRY A. COLE.